Sept. 25, 1923.
H. HOLLINGDRAKE
TIME COMPUTER
Filed Feb. 9, 1921
1,468,862
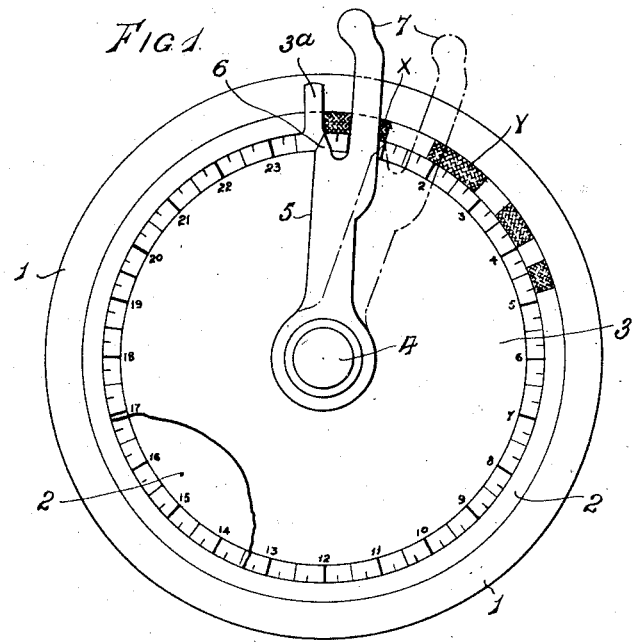
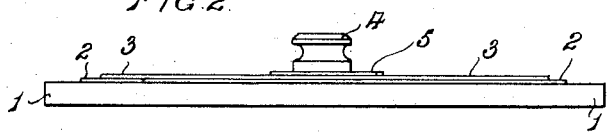
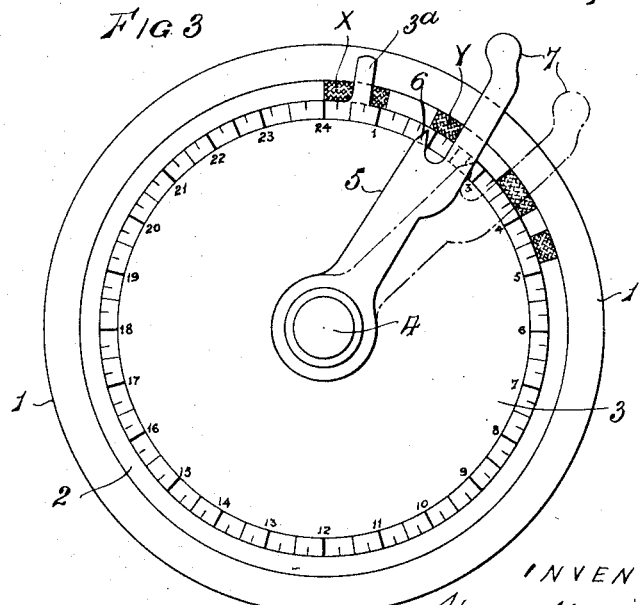
INVENTOR:
Henry Hollingdrake
By Wm Wallace White
ATTY.

Patented Sept. 25, 1923.

1,468,862

UNITED STATES PATENT OFFICE.

HENRY HOLLINGDRAKE, OF STOCKPORT, ENGLAND.

TIME COMPUTER.

Application filed February 9, 1921. Serial No. 443,696.

*To all whom it may concern:*

Be it known that I, HENRY HOLLINGDRAKE, a subject of the King of Great Britain, residing at Prince's Street, Stockport, in the county of Chester, England, have invented new and useful Improvements in Time Computers, for which I have obtained a patent in Great Britain No. 155,929, dated January 6, 1921, the application for which was filed October 9, 1919, No. 24,746, and of which the following is a specification.

This invention relates to angle-measuring apparatus, the principal object of the invention being to provide a device of this character particularly adapted for use in measuring the sum of the records produced in "in-motion" recorders such as that shown and described in Letters Patent of the United States, #1,282,693, granted to me under date of October 22, 1918.

With the foregoing and other objects in view, which will appear as the description proceeds, the invention consists in the novel features of construction and combination of parts which will be more fully described hereinafter and particularly pointed out in the claim.

In the drawings accompanying and forming part of this specification.

Fig. 1 is a plan view of a device constructed in accordance with the present invention, the full and dotted lines indicating respectively different relative positions of the parts during the operation of the device;

Fig. 2 is a side elevation thereof; and

Fig. 3 is a view similar to Fig. 1, but showing the parts in full and dotted lines in different relative positions from those shown in Fig. 1.

The same characters of reference designate the same parts in the different figures of the drawings.

Referring to the drawings, 1 designates a base plate or table, which may be the revolving table of the recorder of my prior patent hereinbefore referred to, and 2 is a chart bearing records X, Y that have previously been made on such chart by the recording apparatus described in said patent, the chart being graduated adjacent to its periphery preferably to indicate hours, half hours, and quarter hours, although these graduations may indicate degrees if so desired.

For carrying out the object of the present invention, I have provided a disk, or spider wheel 3, provided at its axial center with a boss having a knob or button head 4, by means of which the disk may be rotated, the boss being preferably provided with a recess (not shown) extending thereinto from its underside to enable it to fit over the end of a spindle or other axis for centering the disk 3 on the base 1. The disk 3 is graduated adjacent to its periphery to correspond with the graduations of the chart 2, and is provided with an index finger or marker $3^a$ for initially indicating the proper alignment of the disk. On the boss 4 is mounted for rotation a radially extending arm 5 having a pointer 6 and a thumb piece 7 for manipulating said arm, said thumb piece being offset from said pointer and extending beyond the periphery of the disk.

The operation of the device is as follows:

Assuming that the record marks X, Y have been produced on the in-motion recorder described in the prior patent referred to and it is desired to measure the sum of the lengths of the records X and Y, the chart 2 is placed upon the table 1 and the disk 3 centered on said chart. The disk is then rotated by means of the knob 4 until its index finger $3^a$ coincides with the point where the first record X begins. The disk is then manually held against rotation, while the arm 5 is rotated by means of its thumb piece 7 until the pointer 6 arrives in alignment with the end of said record X, as shown in dotted lines in Fig. 1. It will thus be seen that the angular length of the record X is indicated on the disk 3 between the index $3^a$ and the pointer 6. With these members in this relative position, the disk is again rotated by means of the knob until the pointer 6 arrives in alignment with the beginning of the second record Y, as shown in full lines in Fig. 3. The disk is then held against rotation, while the arm is rotated until its pointer 6 is in alignment with the end of said second record, as shown in dotted lines in Fig. 3. The angular distance thus indicated on disk 3 between the index $3^a$ and pointer 6 is the sum of the lengths of records X and Y, and it will readily be seen that by rotating the disk 3 until the pointer 6 of the arm 5 is in alignment with the beginning of each succeeding record and then holding the disk against rotation while the arm is rotated to bring the pointer in alignment with the end of such record, the angular distance through which the arm 5 has traveled relatively to the index 3ª will be the sum of the lengths of all of the records measured.

Having thus described my invention, what I claim is:

An angle-measuring apparatus, comprising a supporting member, a graduated disk adapted to be rotated on said supporting member and having a radially extending index finger, and an arm mounted for rotation relative to said disk and carrying a pointer having its free end within the periphery of the disk and an operating portion offset from said pointer and extending beyond the periphery of the disk.

In testimony whereof I have signed my name to this specification.

HENRY HOLLINGDRAKE.

Witnesses:
HERBERT ROWLAND ABBEY,
IRENE MAY NOEL HOPWOOD.